(12) United States Patent
Yumura et al.

(10) Patent No.: US 6,647,364 B1
(45) Date of Patent: Nov. 11, 2003

(54) HYPERTEXT MARKUP LANGUAGE DOCUMENT TRANSLATING MACHINE

(75) Inventors: Takeshi Yumura, Neyagawa (JP); Naoyuki Yoden, Toyonaka (JP); Hiroki Ohnishi, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/571,315

(22) Filed: May 15, 2000

Related U.S. Application Data

(62) Division of application No. 08/636,968, filed on Apr. 24, 1996, now Pat. No. 6,073,143.

(30) Foreign Application Priority Data

| Oct. 20, 1995 | (JP) | 7-272910 |
| Oct. 20, 1995 | (JP) | 7-272911 |
| Jan. 24, 1996 | (JP) | 8-009897 |
| Jan. 24, 1996 | (JP) | 8-009898 |
| Feb. 28, 1996 | (JP) | 8-041183 |

(51) Int. Cl.$^7$ ............................................. G06F 17/28
(52) U.S. Cl. ............................................. 704/4; 707/513
(58) Field of Search ................. 704/2–7, 8; 707/513, 707/536

(56) References Cited

U.S. PATENT DOCUMENTS

| 4,962,452 A | * | 10/1990 | Nogami et al. | 704/5 |
| 5,005,127 A | * | 4/1991 | Kugimiya et al. | 704/3 |
| 5,548,508 A | * | 8/1996 | Nagami | 704/5 |
| 5,587,902 A | * | 12/1996 | Kugimiya | 704/3 |
| 5,761,663 A | | 6/1998 | Legarde et al. | 707/10 |
| 5,778,356 A | | 7/1998 | Heiny | 707/2 |
| 5,781,714 A | | 7/1998 | Collins et al. | 345/471 |
| 5,848,386 A | * | 12/1998 | Motoyama | 704/5 |
| 5,987,401 A | * | 11/1999 | Trudeau | 704/2 |

FOREIGN PATENT DOCUMENTS

| JP | 05-6396 | 1/1993 |
| JP | 08-202734 | 8/1996 |

OTHER PUBLICATIONS

Murata, et al., WWW Machine Translation System: W3–PENSEE, Kansai Lab, Research & Development Group, Oki Electric Industry Co., Ltd., pp 149–154, Jul. 21, 1995.

Notice of Rejection issued by Japanese Patent Office in JP 8–009897 on Sep. 22, 1998 (including English–language translation) and attachment thereto (see entry at AL).

Murata, et al., "WWW Machine Translation System:W3–PENSEE", ISSN 0919–6072, 95:69, pp. 149–154, Jul. 20 1995 (including English language translation).

Notice of Rejection issued by Japanese Patent Office in JP 8–009897 on Apr. 27, 1999 (including English–language translation) with entry at AH attached thereto.

Notice of Rejection issued by Japanese Patent Office in JP 8–041183 on Feb. 12, 2002 (including English–language translation) with entry at AI attached thereto.

\* cited by examiner

*Primary Examiner*—Patrick N. Edouard
(74) *Attorney, Agent, or Firm*—Smith, Gambrell & Russell, LLP

(57) ABSTRACT

The present invention relates to a hypertext markup language (HTML) translating machine. The HTML translating machine automatically converts a HTML document with text described in a first language into a HTML document with text described in a second language.

2 Claims, 10 Drawing Sheets

FIG. 11

<A HREF=" http ://Ejj | www.abc.co.jp/" >ABCのホームページ</A>

FIG. 12

<A HREF=" http ://www.abc.co.jp/" >ABCのホームページ</A>

HYPERTEXT MARKUP LANGUAGE DOCUMENT TRANSLATING MACHINE

This application is a division of U.S. Ser. No. 08/636,968 filed Apr. 24, 1996, now U.S. Pat. No. 6,073,143 which is incorporated herein in its entirety by reference.

BACKGROUND OF THE INVENTION

1. Field of the Invention

The present invention relates to a document conversion system of a document which is available through a network such as an internet.

2. Description of the Prior Art

WWW (world wide web) is a distributed information system based upon the concept of a hypertext. When a document put on a WWW server on an internet is required, a user designates its document name URL (Uniform Resource Locator) from a browser. Consequently, a transmission request is sent to the WWW server having the document from the browser. From the WWW server having the document, the document is sent to the browser.

In the document (the hypertext) sent from the WWW server, a link (hyperlink information) pointing to another document or the like is embedded. The hypertext is generally described in a language called HTML (Hypertext markup language). In the HTML, the hyperlink information is described using a start tag <A . . . > and an end tag </A>, as shown in FIG. 12. Information at the link destination is designated as "http://www.abc.co.jp/" by the URL.

Furthermore, an anchor of a hyperlink such as a keyword, for example, "Home page of ABC" is inserted between the start tag <A . . . > and the end tag </A>. When the keyword which is the anchor of the hyperlink is clicked, a transmission request is sent to a server having a document at the link destination from the browser. From the server having the document at the link destination, the document is sent to the browser. Consequently, the document at the link destination is displayed.

In many cases, the document sent from the server on the internet is English. If the document sent from the server can be automatically translated into Japanese and displayed, therefore, it is expected that the utilization of the internet is further promoted.

When the hypertext is translated from English into Japanese, for example, a tag enclosed by a sign "<" and a sign ">" or a tag enclosed by a sign "/" and a sign ">" is left as it is without being translated. An English sentence in the other portion is translated into Japanese. Consequently, the keyword which is the anchor of the hyperlink included in the hyperlink information is also translated.

The keyword which is the anchor of the hyperlink has a jumping function to the contents related thereto. When the keyword is not suitably translated, therefore, it is difficult to designate a suitable jumping destination. For example, in a case where the keyword is "trial" meaning judicial examination or inquiry in a court of law, when it is translated into not "裁判" but "試み", it is difficult to presume "裁判" from Japanese "試み". Consequently, information relating to "裁判" is not readily available.

SUMMARY OF THE INVENTION

An object of the present invention is to provide a document conversion system capable of making available, when a document is required by a hyperlink function, a document which is subjected to document conversion such as translation.

Another object of the present invention is to provide a method of translating a hypertext type document, which allows a translated sentence in which an anchor of a hyperlink in the hypertext type document is translated or a translated sentence in which an anchor of a hyperlink is left as it is without being translated to be obtained depending on the selection of a user.

Still another object of the present invention is to provide an HTML document translating machine capable of automatically converting an HTML document whose text is described in a first language into an HTML document whose text is described in a second language.

A first document conversion system according to the present invention comprises data monitoring means provided in a user-side application, a server-side application and between the applications, and is characterized in that the user-side application and the data monitoring means are provided in a user-side device, and the data monitoring means comprises means for adding tag information representing a document conversion method to hyperlink information included in a hypertext type document sent to the user-side device from the server-side application and sending to the user-side application the hyperlink information to which the tag information is added, and means for converting, when the tag information representing the document conversion method is included in a command to request retrieval which is sent from the user-side application, a document sent from the server-side application as the results of the retrieval in accordance with the document conversion method represented by the tag information and sending the converted document to the user-side application. Examples of the tag information representing the document conversion method include tag information indicating that a given language is converted into another language.

A second document conversion system according to the present invention comprises data monitoring means provided in a user-side application, a server-side application and between the applications, and is characterized in that the user-side application and the data monitoring means are provided in a user-side device, the data monitoring means comprises means for adding tag information representing a document conversion method to hyperlink information included in a hypertext type document sent to the user-side device from the server-side application and sending to the user-side application the hyperlink information to which the tag information is added, and the server-side application converts, when the tag information representing the document conversion method is included in a command to request retrieval which is sent from the user-side device, a document which is the results of the retrieval in accordance with the document conversion method represented by the tag information and sending the converted document to the user-side device. Examples of the tag information representing the document conversion method include tag information indicating that a given language is converted into another language.

In the first or second document conversion system of a hypertext type document according to the present invention, when an anchor of a hyperlink (a keyword) in the hypertext type document displayed on the user-side device by the user-side application is clicked, a document at the link destination which is designated by corresponding hyperlink information is automatically converted and displayed.

The data monitoring means may embed, when the tag information representing the document conversion method is added to the hyperlink information included in the hypertext type document sent to the user-side device from the server-side application, hyperlink information whose link destination is the hypertext type document and to which the tag information representing the document conversion method is added in the hypertext type document. This makes it possible to convert the hypertext type document itself displayed on the user-side device by the user-side application and display the converted hypertext type document.

A method of translating a hypertext type document according to the present invention is characterized by making a user select an anchor translation mode in which an anchor of a hyperlink is translated or an anchor non-translation mode in which it is left as it is without being translated, to translate the anchor of the hyperlink when a hypertext type document is translated in a case where the anchor translation mode is selected, while leaving the anchor of the hyperlink as it is when the hypertext type document is translated in a case where the anchor non-translation mode is selected.

The hyperlink information comprises a start tag representing hyperlink information, an end tag representing hyperlink information, and an anchor of a hyperlink interposed between the start tag and the end tag. When the anchor translation mode is selected, the start tag and the end tag are recognized as respective one words and are stored in relation to the anchor. After only the anchor is translated, the start tag and the end tag are added to an equivalent of the anchor.

When the anchor non-translation mode is selected, the entire hyperlink information is recognized as one word, so that the hyperlink information is left as it is without being translated.

In the method of translating a hypertext type document according to the present invention, a translated sentence in which an anchor of a hyperlink in a hypertext type document is translated or a translated sentence in which an anchor of a hyperlink is left as it is without being translated can be obtained depending on the selection by a user.

A first HTML document translating machine according to the present invention is for converting an HTML document whose text is described in a first language into an HTML document whose text is described in a second language.

In the first HTML document translating machine according to the present invention, a first tag modifying the entire sentence is retrieved from the original text. When the first tag modifying the entire sentence exists, a sentence obtained by removing the first tag modifying the entire sentence from the original text is taken as a sentence to be subjected to form elementary analysis. The tag modifying the entire sentence is stored in relation to the sentence to be subjected to form elementary analysis.

The sentence to be subjected to form elementary analysis is subjected to form elementary analysis including word division and grammar analysis. A second tag modifying one or a plurality of words is retrieved from the sentence to be subjected to form elementary analysis on the basis of the results of the form elementary analysis. When the second tag modifying one or a plurality of words exists, a start tag which together with an end tag, constitutes the second word is stored in relation to a first word just behind the start tag, and the end tag is stored in relation to a second word just ahead of the end tag.

A sentence obtained by removing the second tag from the sentence to be subjected to form elementary analysis is subjected to syntactic and semantic analysis. Equivalents in a second language are respectively assigned to words constituting the sentence obtained by removing the second tag from the sentence to be subjected to form elementary analysis on the basis of the results of the analysis. The equivalents are so assembled as to constitute a sentence in the second language, to form a translated sentence in the second language.

In the formed translated sentence, the start tag stored in relation to the first word is added ahead of the equivalent corresponding to the first word, and the end tag stored in relation to the second word is added behind the equivalent corresponding to the second word. The first tag modifying the entire sentence is added to a sentence thus obtained.

A second HTML document translating machine according to the present invention is for converting an HTML document whose text is described in a first language into an HTML document whose text is described in a second language.

In the second HTML document translating machine according to the present invention, a first tag modifying only one character is retrieved from the original text. When the first tag modifying only one character exists, the position of the first tag is so changed that the first tag modifies either one of the entire sentence and a word including the character modified by the first tag.

A second tag modifying the entire sentence is retrieved from the original text in which the position of the first tag has been changed. When the second tag modifying the entire sentence exists, a sentence obtained by removing the second tag modifying the entire sentence from the original text is taken as a sentence to be subjected to form elementary analysis. The second tag modifying the entire sentence is stored in relation to the sentence to be subjected to form elementary analysis.

The sentence to be subjected to form elementary analysis is subjected to form elementary analysis including word division and grammar analysis. When a third tag modifying one or a plurality of words is retrieved from the sentence to be subjected to form elementary analysis on the basis of the results of the form elementary analysis. When the third tag modifying one or a plurality of words exists, a start tag which together with an end tag, constitutes the third tag is stored in relation to a first word just behind the start tag, and the end tag is stored in relation to a second word just ahead of the end tag.

A sentence obtained by removing the third tag from the sentence to be subjected to form elementary analysis is subjected to syntactic and semantic analysis. Equivalents in a second language are respectively assigned to words constituting the sentence obtained by removing the third tag from the sentence to be subjected to form elementary analysis on the basis of the results of the analysis. The equivalents are so assembled as to constitute a sentence in the second language, to form a translated sentence in the second language.

In the formed translated sentence, the start tag stored in relation to the first word is added ahead of the equivalent corresponding to the first word, and the end tag stored in relation to the second word is added behind the equivalent corresponding to the second word. The second tag modifying the entire sentence is added to a sentence thus obtained.

In the HTML document translating machine according to the present invention, the HTML document whose text is described in the first language can be automatically converted into the HTML document whose text is described in the second language. Consequently, an HTML document prepared in a language in its own country can be automatically converted into an HTML document in a language in the other country.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a diagram showing hyperlink information to which a translation command is added; and FIG. 12 is a diagram showing one example of hyperlink information.

DESCRIPTION OF THE PREFERRED EMBODIMENTS

Figure 1:
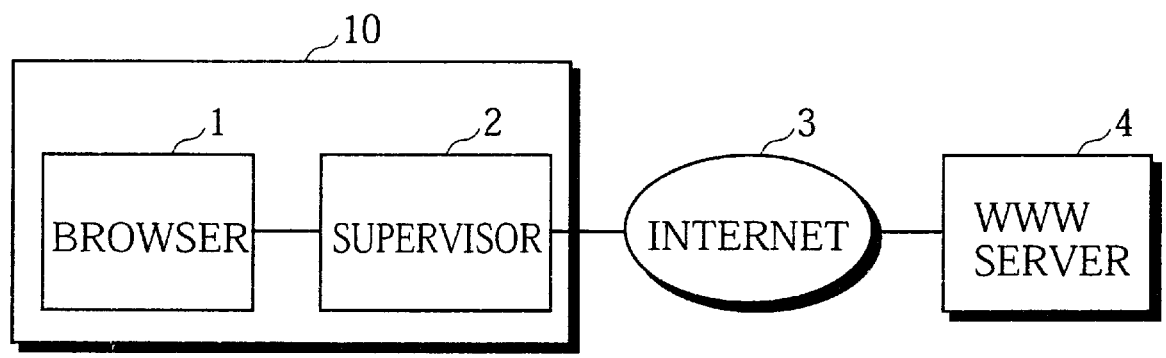
FIG. 1 is a block diagram showing the construction of a document conversion system.

Referring now to the drawings, description is made of an embodiment in a case where the present invention is applied to a document conversion system for converting an English document into a Japanese document.

(1) Description of First Embodiment

FIG. 1 illustrates the construction of a document conversion system in which an English document is converted into a Japanese document.

Figure 2:
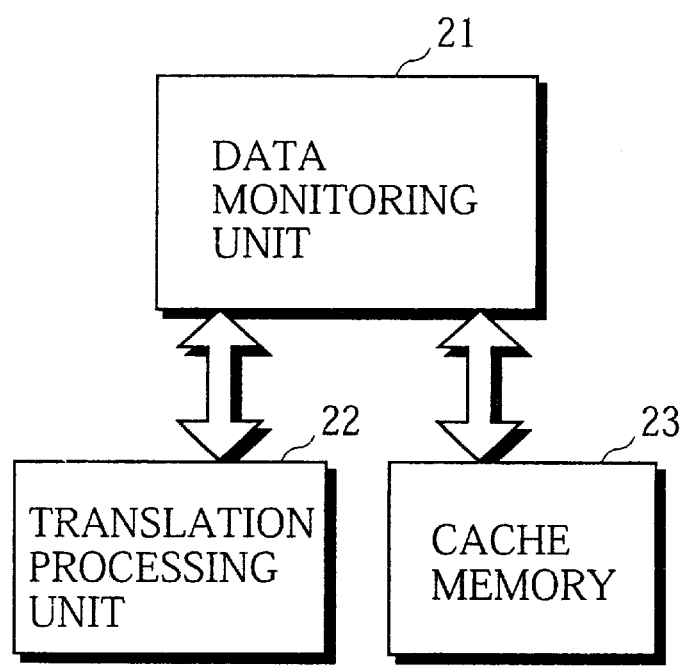
FIG. 2 is a block diagram showing the construction of a supervisor.

The system comprises a personal computer (a user-side device) 10 provided on the side of a user and a WWW server (a server-side application) 4 connected to the personal computer 10 through an internet 3. The personal computer 10 comprises a browser (a user-side application) 1 and a supervisor (data monitoring means) 2. The supervisor 2 comprises a data monitoring unit 21, a translation processing unit 22, and a cache memory 23, as shown in FIG. 2.

Figure 3:
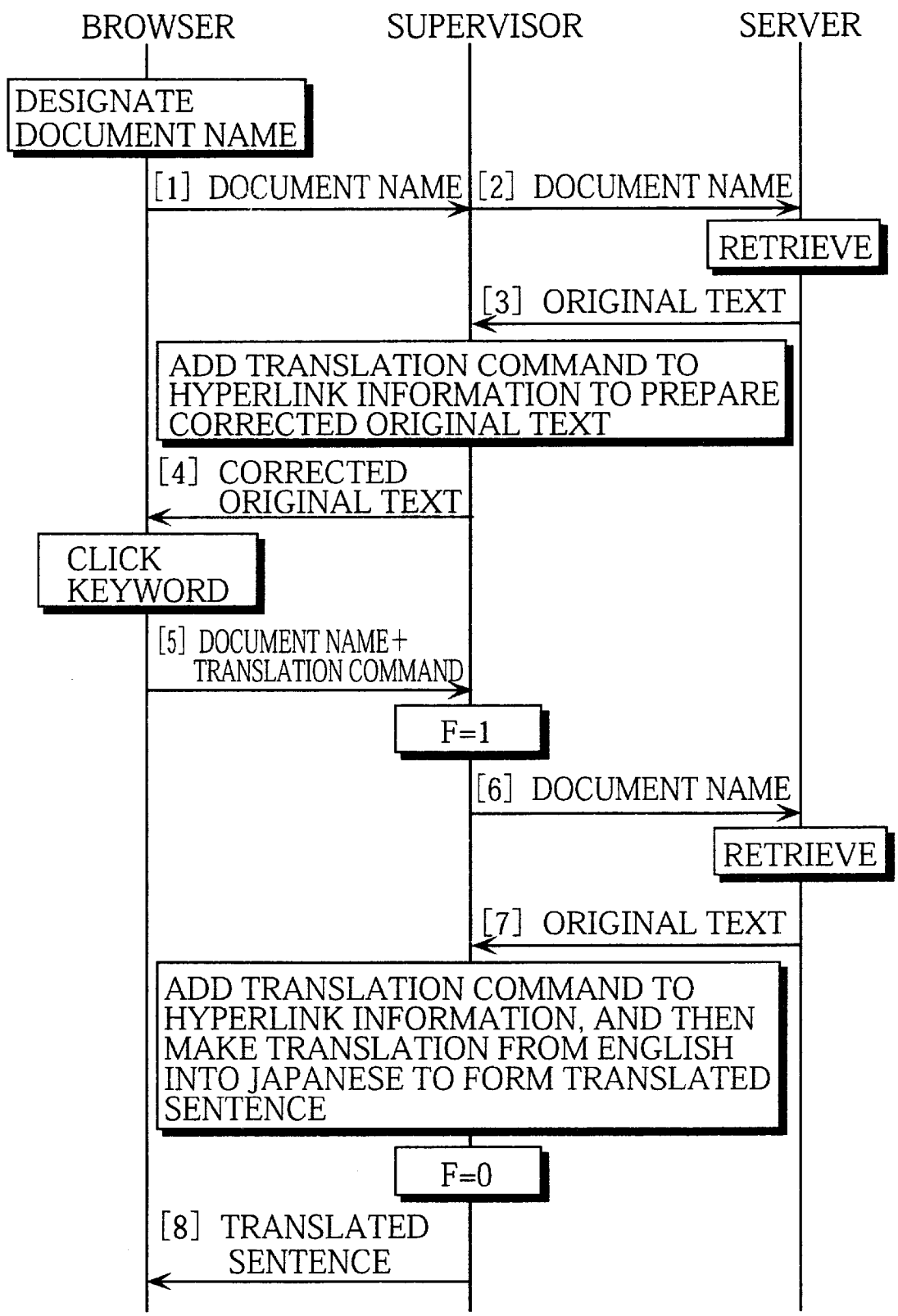
FIG. 3 is a sequence diagram showing the flow of processing according to a first embodiment of the present invention.

FIG. 3 shows the flow of data among the browser 1, the supervisor 2, and the server 4. In FIG. 3, a numeral put in brackets represents a sequence number.

When a user designates from the browser 1 the name URL of a document put on the WWW server 4 on the internet 3, the document name is transmitted to the server 4 having the document through the supervisor 2 from the browser 1 (Sequence NO. 1 and NO. 2).

The server 4 retrieves a corresponding document (an original text) from a data base on the basis of the sent document name, and transmits the retrieved document to the supervisor 2 (Sequence NO. 3). The supervisor 2 adds tag information representing a command to translate English into Japanese (hereinafter simply referred to as a translation command) to each hyperlink information included in the sent document (hypertext), and then sends an obtained document (a corrected original text) to the browser 1 (Sequence NO. 4). FIG. 11 shows an example in a case where a translation command is added to hyperlink information shown in FIG. 12. In this example, "EJJ" is a translation command.

Thereafter, when the user clicks an anchor of a hyperlink (a keyword, etc.) included in the document displayed by the browser 1, the name of a document at the link destination and a translation command which are included in corresponding hyperlink information are sent to the supervisor 2 from the browser 1 (Sequence NO. 5). When the name of the document at the link destination and the translation command are sent to the supervisor 2 from the browser 1, the supervisor 2 sets a flag F (F=1). The supervisor 2 transmits only the name of the document out of the name of the document and the translation command which are sent from the browser 1 to the sever 4 having the document (Sequence NO. 6).

The server 4 retrieves a corresponding document from the database on the basis of the sent document name, and transmits the retrieved document to the supervisor 2 (Sequence NO. 7). Since the flag F has been set, the supervisor 2 adds a translation command to each hyperlink information included in the sent document, and then translates the sent document into Japanese. In this case, information other than the text, for example, the document name URL and tags are not translated. Upon resetting the flag F (F=0), the supervisor 2 sends a document after the translation (a translated sentence) to the browser 1 (Sequence NO. 8).

Thereafter, every time the user clicks an anchor of a hyperlink included in the displayed document, the same processing as that in Sequence NO. 5 to NO. 8 is performed.

The server 4 may have the translation processing unit. In this case, when the name of a document and a translation command are sent to the supervisor 2 from the browser 1, the supervisor 2 sends both the document name and the translation command to the server 4. When the document name and the translation command are sent, the server 4 reads out the document from the database to translate the document, and sends a document after the translation to the supervisor 2. The supervisor 2 adds a translation command to each hyperlink information included in the sent document (a translated sentence), and sends to the browser 1 the hyperlink information to which the translation command is added.

(2) Description of Second Embodiment

The system configuration is the same as that shown in FIG. 1. In the second embodiment, when the supervisor 2 adds a translation command to each hyperlink information included in a document sent from the server 4 in the above-mentioned first embodiment, the supervisor 2 further embeds in the document hyperlink information whose link destination is the document itself. As an anchor of the hyperlink information whose link destination is the document itself, a button (hereinafter referred to as a self-document designating button) is used. Description is made of processing of the supervisor 2 in this case.

Figure 4:
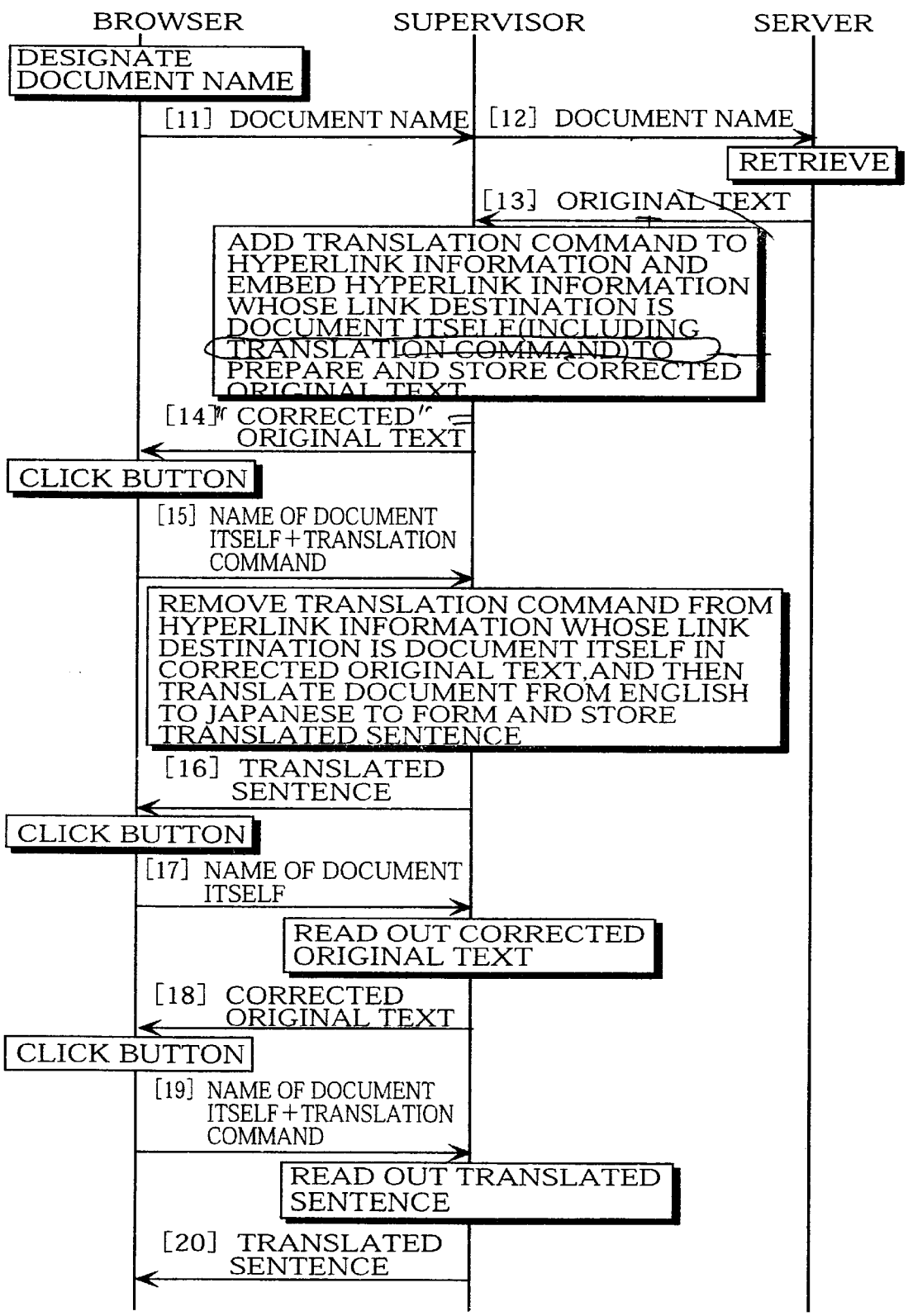
FIG. 4 is a sequence diagram showing the flow of processing according to a second embodiment of the present invention.

FIG. 4 shows the flow of processing in a case where a user designates the name URL of a document put on the server 4 on the internet 3 from the browser 1.

When the user designates the document name URL from the browser 1, the document name is transmitted to the server 4 having the document through the supervisor 2 from the browser 1 (Sequence NO. 11 and NO. 12).

The server 4 retrieves on the basis of the sent document name a corresponding document from a database, and transmits the retrieved document to the supervisor 2 (Sequence NO. 13). When the designated document is sent to the supervisor 2 from the server 4, the supervisor 2 adds a translation command to each hyperlink information included in the sent document, and embeds in the sent document hyperlink information whose link destination is the document itself. In this case, a translation command is added to the hyperlink information whose link destination is the document itself. A document thus prepared is stored in the cache memory 23 and is sent to the browser 1 as a corrected original text (Sequence NO. 14).

In a state where the corrected original text is displayed by the browser 1, when the user clicks the self-document designating button, the name of the document itself, together with the translation command, is sent to the supervisor 2 (Sequence NO. 15). When the document name and the translation command are sent, the supervisor 2 reads out the corrected original text stored in the cache memory 23. The translation command added to the hyperlink information whose link destination is the document itself is removed from the corrected original text read out, after which an obtained document is translated into Japanese. A document thus prepared is stored in the cache memory 23 and is sent to the browser 1 as a translated sentence (Sequence NO. 16).

In a state where the translated sentence is displayed by the browser 1, when the user clicks the self-document designating button, no translation command is added to the hyperlink information whose link destination is the document itself in this case, whereby only the name of the document itself is sent to the supervisor 2 (Sequence NO. 17). In this case, therefore, the supervisor 2 reads out the corrected original text stored in the cache memory 23, and sends the corrected original text read out to the browser 1 (sequence NO. 18).

In a state where the corrected original text is displayed by the browser 1, when the user clicks the self-document designating button, the translation command is added to the hyperlink information whose link destination is the document itself in this case, whereby the translation command, together with the name of the document itself, is sent to the supervisor 2 (Sequence NO. 19). In this case, therefore, the supervisor 2 reads out the translated sentence stored in the cache memory 23, and sends the translated sentence read out to the browser 1 (Sequence NO. 20).

Figure 5:
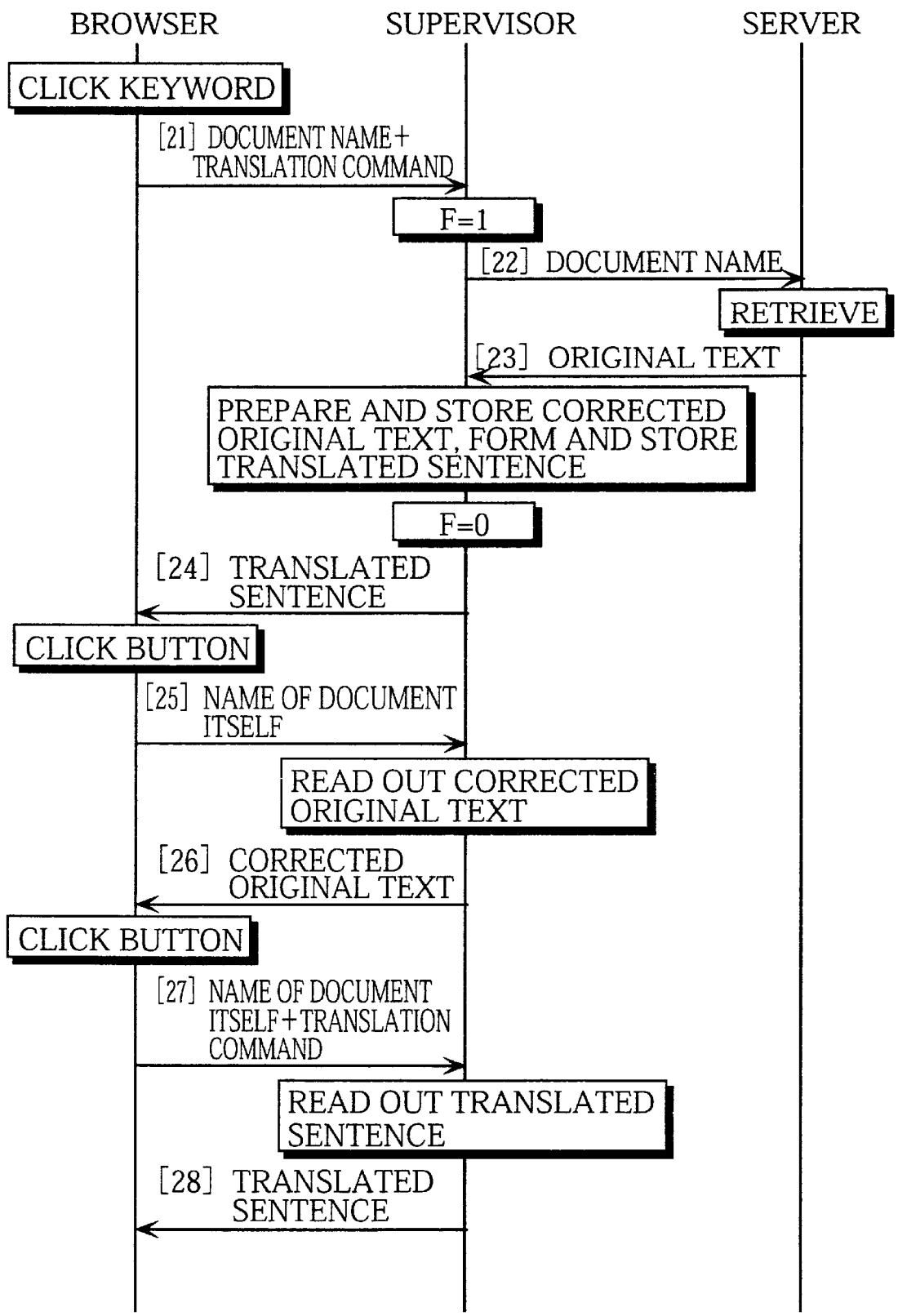
FIG. 5 is a sequence diagram showing the flow of processing according to the second embodiment of the present invention.

FIG. 5 shows the flow of processing in a case where a user clicks an anchor of a hyperlink included in a displayed document.

When the user clicks an anchor of a hyperlink (a keyword, etc.) included in a displayed document, the name of a document at the link destination and a translation command which are included in corresponding hyperlink information are sent to the supervisor 2 from the browser 1 (Sequence NO. 21). When the name of the document at the link destination and the translation command are sent to the supervisor 2 from the browser 1, the supervisor 2 sets a flag F (F=1). The supervisor 2 transmits only the document name out of the document name and the translation command which are sent from the browser 1 to the server 4 having the document (Sequence NO. 22).

The server 4 retrieves on the basis of the sent document name a corresponding document from a database, and transmits the retrieved document to the supervisor 2 (Sequence NO. 23). Since the flag F has been set, the supervisor 2 first prepares a corrected original text and stores the corrected original text prepared in the cache memory 23, and then forms a translated sentence and stores the formed translated sentence in the cache memory 23. Upon resetting the flag F (F=0), the supervisor 2 sends the translated sentence to the browser 1. Consequently, the translated sentence is displayed by the browser 1.

Specifically, the supervisor 2 adds a translation command to each hyperlink information included in the sent document, and embeds in the sent document hyperlink information whose link destination is the document itself. In this case, a translation command is added to the hyperlink information whose link destination is the document itself. A document thus prepared is stored as a corrected original text in the cache memory 23.

The supervisor 2 reads out the corrected original text from the cache memory 23. The translation command is removed from the hyperlink information whose link destination is the document itself which is included in the corrected original text read out, after which the document is translated into Japanese. A document thus prepared is stored in the cache memory 23 and is sent to the browser 1 as a translated sentence (Sequence NO. 24).

In a state where the translated sentence is displayed by the browser 1, when the user clicks the self-document designating button, no translation command is added to the hyperlink information whose link destination is the document itself in this case, whereby only the name of the document itself is sent to the supervisor 2 (Sequence NO. 25). In this case, therefore, the supervisor 2 reads out the corrected original text stored in the cache memory 23, and sends the corrected original text read out to the browser 1 (sequence NO. 26).

In a state where the corrected original text is displayed by the browser 1, when the user clicks the self-document designating button, the translation command is added to the hyperlink information whose link destination is the document itself in this case, whereby the translation command, together with the name of the document itself, is sent to the supervisor 2 (Sequence NO. 27). Therefore, the supervisor 2 reads out the translated sentence stored in the cache memory 23, and sends the translated sentence read out to the browser 1 (Sequence NO. 28).

The server 4 may have the translation processing unit. In this case, when the name of a document and a translation command are sent to the supervisor 2 from the browser 1, the supervisor 2 sends both the document name and the translation command to the server 4. When the document name and the translation command are sent, the server 4 retrieves the document from the database to translate the document, and sends a document after the translation to the supervisor 2. The supervisor 2 adds a translation command to each hyperlink information included in the sent document (a translated sentence), and embeds in an obtained document the hyperlink information whose link destination is the document itself and sends the document to the browser 1.

(3) Description of Third Embodiment

The system configuration is the same as that shown in FIG. 1. In the third embodiment, a user can choose which of an original text and a translated sentence is to be displayed.

Figure 6:
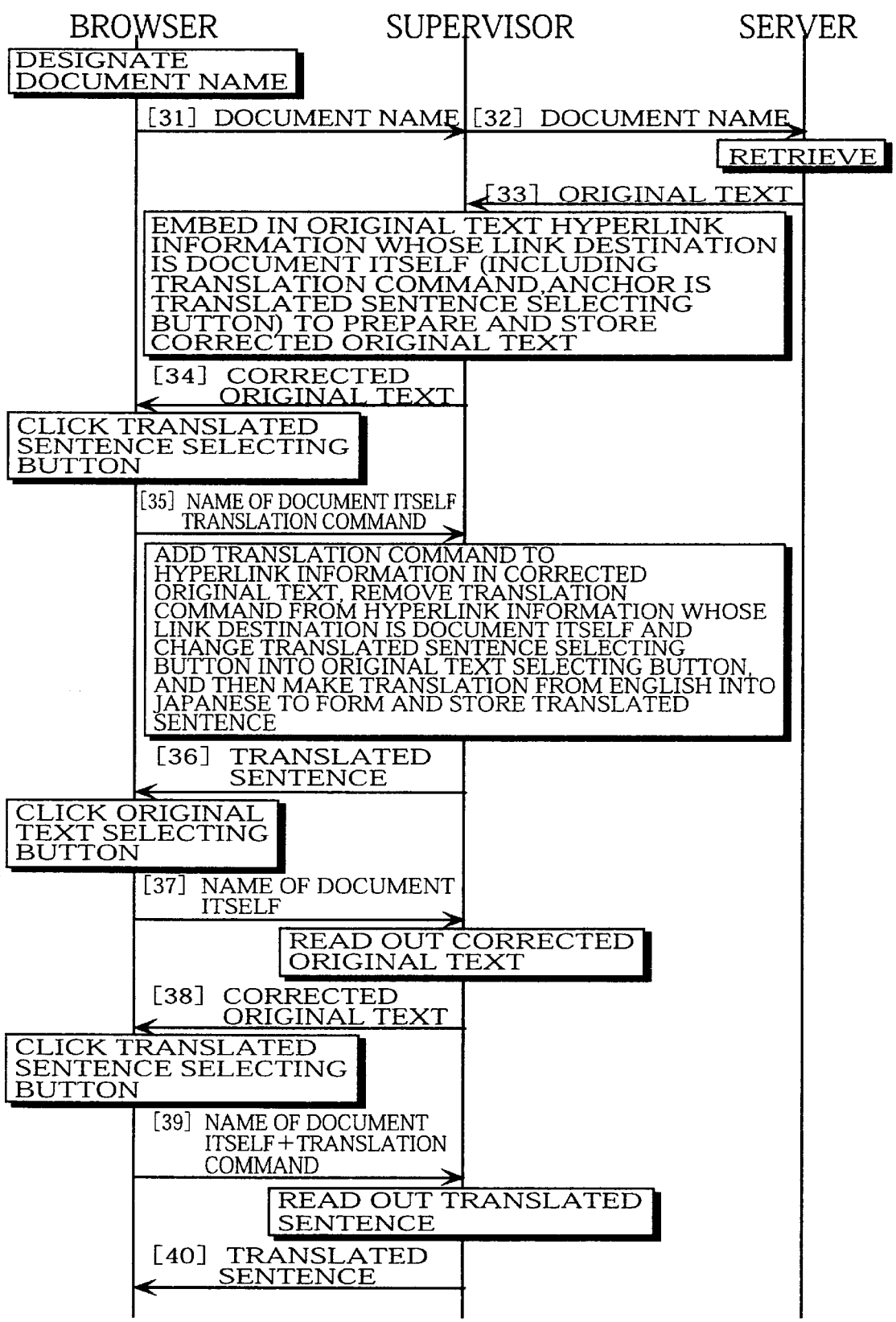
FIG. 6 is a sequence diagram showing the flow of processing according to a third embodiment of the present invention.

FIG. 6 shows the flow of processing in a case where a user designates the name URL of a document put on the server 4 on the internet 3 from the browser 1.

When the user designates the document name URL from the browser 1, the document name is transmitted to the server 4 having the document through the supervisor 2 from the browser 1 (Sequence NO. 31 and NO. 32).

The server 4 retrieves on the basis of the sent document name a corresponding document from a database, and transmits the retrieved document to the supervisor 2 (Sequence NO. 33). When the designated document is sent to the supervisor 2 from the server 4, the supervisor 2 embeds in the sent document hyperlink information whose link destination is the document itself.

As an anchor of the hyperlink information whose link destination is the document itself, a translated sentence selecting button or an original text selecting button is used. In this case, as the anchor of the hyperlink information whose link destination is the document itself, the translated sentence selecting button is used. When the translated sentence selecting button is used, a translation command is added to the hyperlink information whose link destination is the document itself. A document thus prepared is stored in the case memory 23 and is sent to the browser 1 as a corrected original text (sequence NO. 34).

Thereafter, when the user clicks the translated sentence selecting button, the name of the document itself at the link destination and the translation command are sent to the supervisor 2 from the browser 1 (Sequence NO. 35). When the name of the document itself and the translation command are sent, the supervisor 2 reads out the corrected original text from the cache memory 23, adds a translation command to each hyperlink information other than the hyperlink information whose link destination is the document itself which is included in the corrected original text read out, and removes the translation command from the hyperlink information whose link destination is the document itself. The supervisor 2 further changes the translated sentence selecting button into the original text selecting button. An obtained document is translated from English into Japanese. A document thus prepared is stored in the cache memory 23 and is sent to the browser 1 as a translated sentence (Sequence NO. 36).

Thereafter, when the user clicks the original text selecting button, only the name of the document itself at the link destination is sent to the supervisor 2 from the browser 1 (Sequence NO. 37). When only the name of the document itself is sent from the browser 1, the supervisor 2 reads out the corrected original text from the cache memory 23, and sends the corrected original text read out to the browser 1 (Sequence NO. 38).

Thereafter, when the user clicks the translated sentence selecting button, the name of the document itself at the link destination and the translation command are sent to the supervisor 2 from the browser 1 (Sequence NO. 39). When the name of the document itself and the translation command are sent, the supervisor 2 reads out the translated sentence from the cache memory 23, and sends the translated sentence read out to the browser 1 (Sequence NO. 40).

In a case where the corrected original text is displayed by the browser 1, when the user clicks a keyword of a hyperlink (excluding the translated sentence selecting button) included in the displayed document, only the name of the document at the link destination is sent to the supervisor 2 from the browser 1, whereby the flow of the processing is the same as that shown in FIG. 6.

Figure 7:
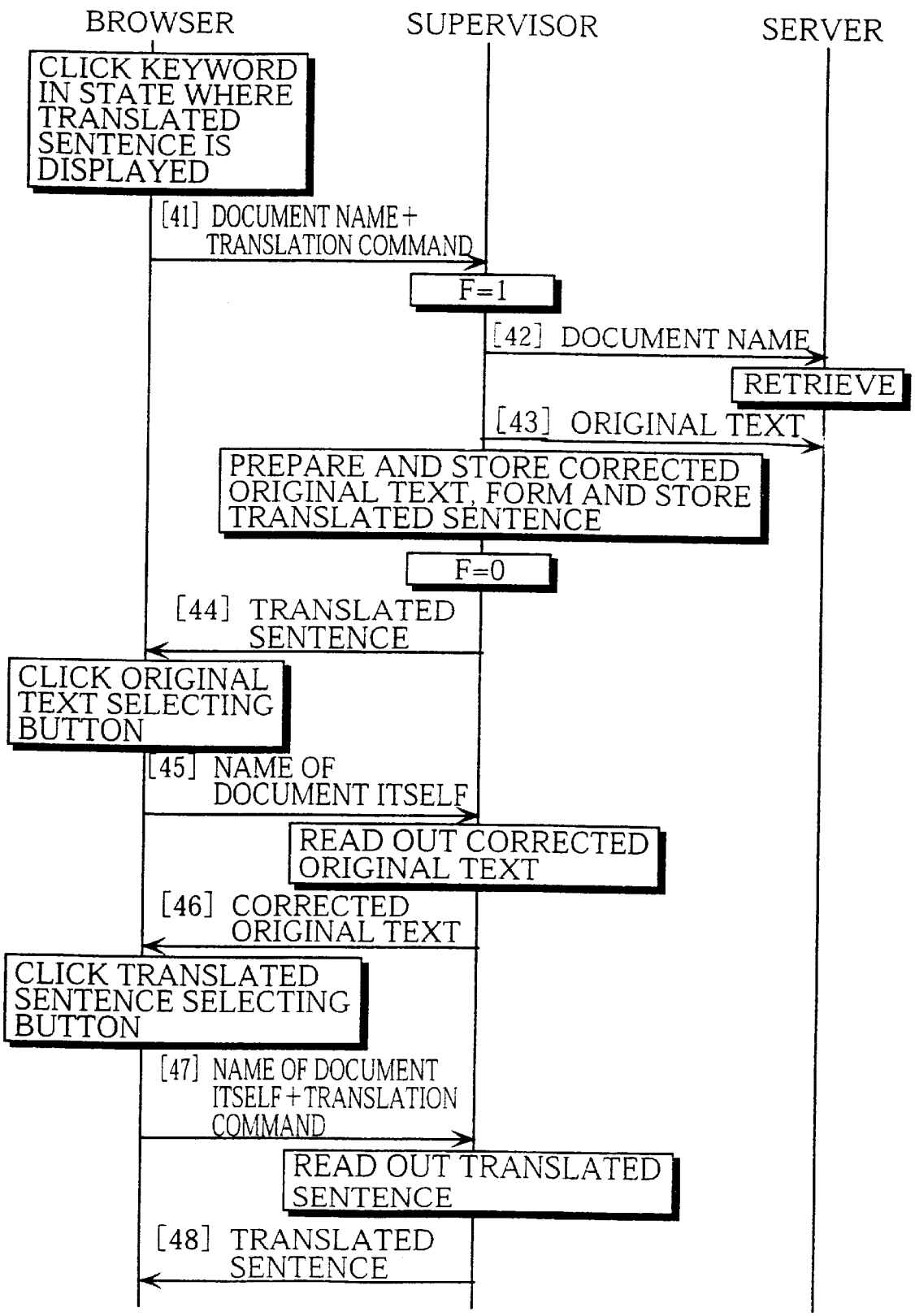
FIG. 7 is a sequence diagram showing the flow of processing according to the third embodiment of the present invention.

FIG. 7 shows the flow of processing in a case where a user clicks, when a translated sentence is displayed by the browser 1, a keyword of a hyperlink (excluding the original text selecting button) included in the displayed document.

In a case where the translated sentence is displayed by the browser 1, when the user clicks the keyword of the hyperlink included in the displayed document, the name of a document at the link destination and a translation command which are included in corresponding hyperlink information are sent to the supervisor 2 from the browser 1 (Sequence NO. 41). When the name of the document itself at the link destination and the translation command are sent to the supervisor 2 from the browser 1, the supervisor 2 sets a flag F (F=1). The supervisor 2 transmits only the document name out of the document name and the translation command which are sent from the browser 1 to the server 4 having the document (Sequence NO. 42).

The server 4 retrieves on the basis of the sent document name a corresponding document from a database, and transmits the retrieved document to the supervisor 2 (Sequence NO. 43). Since the flag F has been set, the supervisor 2 first prepares the corrected original text and stores the corrected original text prepared in the cache memory 23. Upon resetting the flag F (F=0), the supervisor 2 sends the translated sentence to the browser 1. Consequently, the translated sentence is displayed by the browser 1.

Specifically, the supervisor 2 first embeds in the sent document hyperlink information whose link destination is the document itself. In this case, a translation command is added to the hyperlink information whose link destination is the document itself. As an anchor of the hyperlink information whose link destination is the document itself, the translated sentence selecting button is used. A corrected original text thus prepared is stored in the cache memory 23.

The supervisor 2 then reads out the corrected original text. The supervisor 2 adds a translation command to hyperlink information other than the hyperlink information whose link destination is the document itself which is included in the corrected original text read out, and removes the translation command from the hyperlink information whose link destination is the document itself. Further, the button which is the anchor of the hyperlink information whose link destination is the document itself is changed into the original text selecting button. A document thus obtained is translated from English into Japanese, after which a document thus obtained is stored in the cache memory 23 and is sent to the browser 1 as a translated sentence (Sequence NO. 44). Consequently, the translated sentence is displayed by the browser 1.

In a case where the translated sentence is displayed by the browser 1, when the original text selecting button is clicked, the name of the document itself is sent to the supervisor 2 from the browser 1 (Sequence NO. 45). The supervisor 2 reads out the corrected original text from the cache memory 23, and sends the corrected original text read out to the browser 1 (Sequence NO. 46). Consequently, the corrected original text is displayed by the browser 1.

In a case where the corrected original text is displayed by the browser 1, when the translated sentence selecting button is clicked, the translation command, together with the name of the document itself, is sent to the supervisor 2 from the browser 1 (Sequence NO. 47). The supervisor 2 reads out the translated sentence from the cache memory 23, and sends the translated sentence read out to the browser 1 (Sequence NO. 48). Consequently, the translated sentence is displayed by the browser 1.

Although in each of the above-mentioned embodiments, the tag information representing an English-Japanese translation command is added to the hyperlink information, tag information representing another document conversion command such as tag information representing a Japanese-English translation command or tag information representing a kanji code conversion command may be added to the hyperlink information.

Figure 8:
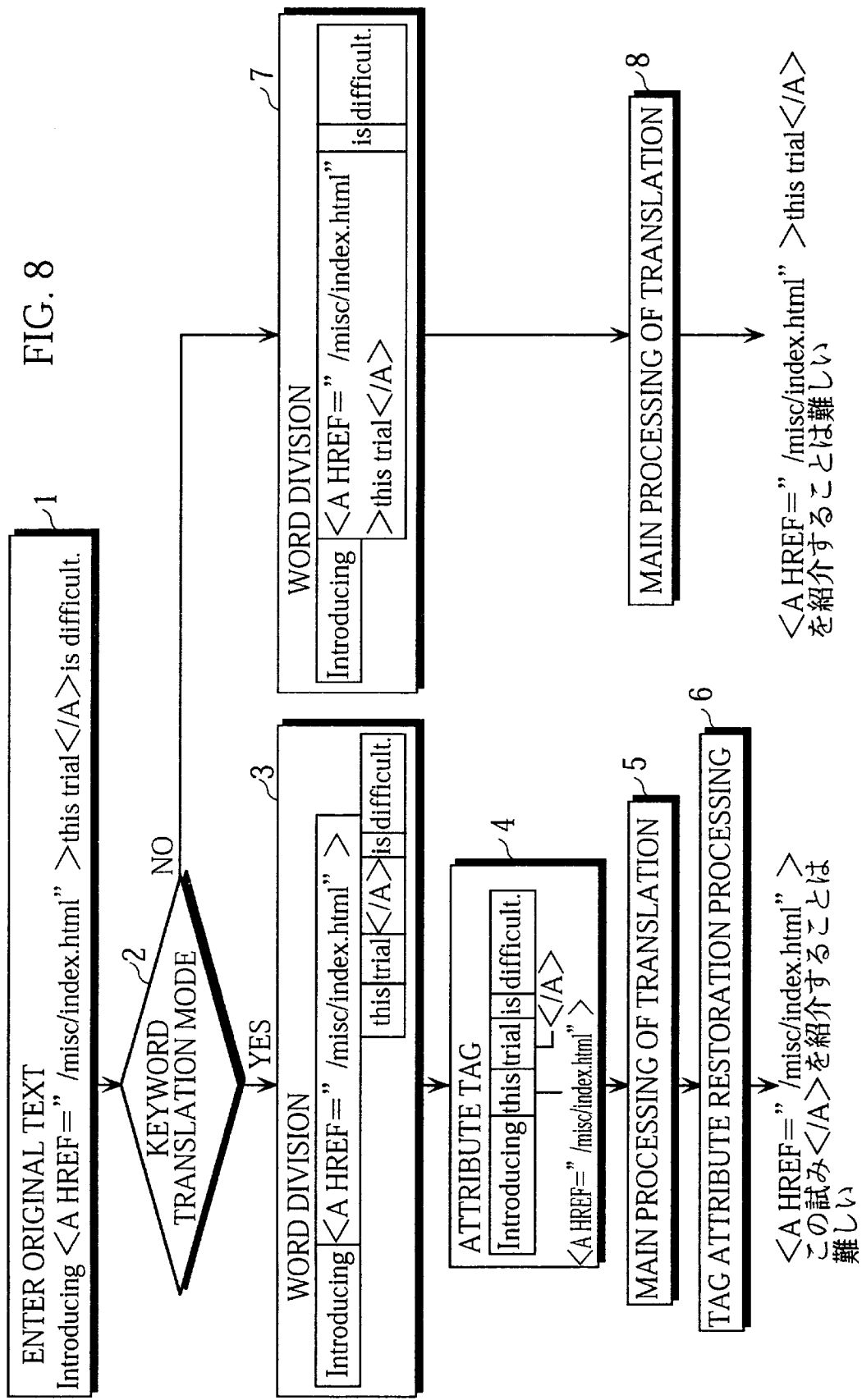
FIG. 8 is a flow chart showing the procedure for translation processing by a translation processing unit.

FIG. 8 shows the procedure for processing in a case where translation from English into Japanese is made by the translation processing unit 22 in each of the above-mentioned embodiments. It is assumed that the translation processing unit 22 is provided in the supervisor 2, as shown in FIG. 1.

When a hypertext is translated from English into Japanese, a start tag enclosed in a sign "<" and a sign ">" or an end tag enclosed in a sign "</" and a sign ">" is left as it is without being translated. An English sentence in the other portion is translated into Japanese. Consequently, a keyword which is an anchor of a hyperlink included in hyperlink information is also generally translated.

The keyword which is the anchor of the hyperlink has a jumping function to the contents related thereto. When the keyword is not suitably translated, therefore, it is difficult to designate a suitable jumping destination. For example, in a case where the keyword is "trial" meaning judicial examination or inquiry in a court of law, when it is translated into not "裁判" but "試み", it is difficult to presume "裁判" from Japanese "試み". Consequently, information relating to "裁判" is not readily available.

In the present embodiment, in making translation from English into Japanese, a user can select a keyword translation mode in which a keyword which is an anchor of a hyperlink is translated or a keyword non-translation mode in which it is not translated.

Description is now made of the procedure in a case where translation from English into Japanese is made by the translation processing unit 22. It is assumed that an original text to be translated is a document comprising a word "Introducing", hyperlink information, a word "is", and a word "difficult", as shown in FIG. 8. The hyperlink information is constituted by a start tag <A...>, an end tag </A>, and two words "this" and "trial" which are inserted therebetween. "this trial" is an anchor of a hyperlink (a keyword).

When an original text to be translated is entered (step 1), it is judged whether or not the mode in which a keyword which is an anchor of a hyperlink is translated is set (step 2). The judgment is made depending on which of the keyword translation mode and the keyword non-translation mode is set by a user.

When the keyword translation mode is set (YES in step 2), word division is first made (step 3). In this case, the entered original text is divided for each tag and for each word other than the tag, as shown in FIG. 8.

The tags are then attributed (step 4). That is, the tag is attributed to words ahead of and behind the tag. As shown in FIG. 8, the start tag <A...> in the hyperlink information is attributed to a word "this" just behind the tag, and the end tag </A> is attributed to a word "trial" just ahead of the tag.

After the attribute processing, main processing of translation is performed (step 5). That is, a sentence composed of a string of words other than the tags is translated from English into Japanese. In this case, "this trail" which is a keyword is also translated.

The tags are then subjected to attribute restoration processing (step 6). Specifically, the attributed tags are added to a translated sentence. Consequently, a translated sentence "<A...>この試み</A>を紹介することは難しい" is outputted. When such a translated sentence is sent to the browser, an actual sentence other than the tags is displayed on a monitor. Consequently, a sentence "この試みを紹介することは難しい".

When in the foregoing step 2, the keyword non-translation mode is set (NO in step 2), word division is first made (step 7). In this case, the hyperlink information <A...> this trial</A> is treated as one word, as shown in FIG. 8. With respect to tags other than the tags used as the hyperlink information, each of the tags is treated as one word. Words other than the tags, that is, words other than a keyword included in the hyperlink information "Introducing", "is", and "difficult" are respectively treated as one words.

Main processing of translation is then performed (step 8). In this case, no words corresponding to the hyperlink information exist in a word dictionary which the translation processing unit 22 has, whereby the words are not translated. Consequently, a sentence composed of a string of words other than the hyperlink information is translated from English into Japanese. Therefore, a translated sentence "<A...> this trial</A> を紹介することは難しい" is outputted. That is, the keyword of the hyperlink is left as it is without being translated. When such a translated sentence is sent to the browser, an actual sentence other than the tags is displayed on the monitor. Consequently, a sentence "this trial を紹介することは難しい" is displayed. Specifically, the keyword is displayed as it is.

Figure 9:
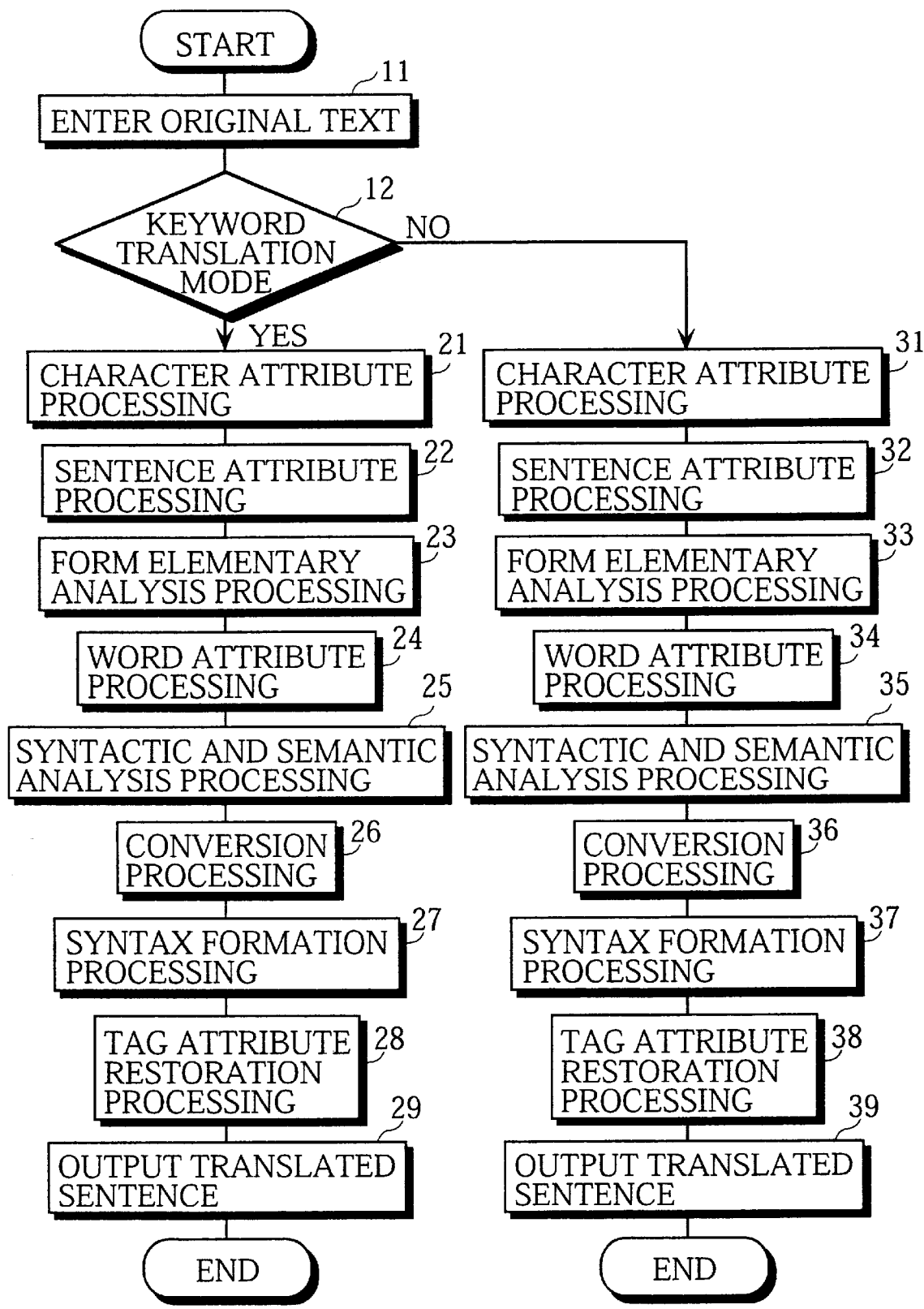
FIG. 9 is a flow chart showing the procedure for translation processing in a case where an HTML document in English is converted into an HTML document in Japanese.

FIG. 9 shows the procedure for more detailed processing in a case where translation from English into Japanese is made by the translation processing unit 22. The translation processing unit 22 shall be provided in the supervisor 2, as shown in FIG. 1.

As tags employed in HTML, tags such as tags <TITLE> and </TITLE> representing a title, tags <HEAD> and </HEAD> representing information to be put on a head portion, a tag <IMG SRC="URL" for designating a graphic image, tags <B> and </B> indicating that a sentence put between the tags is displayed by boldface, tags <CODE> and </CODE> representing a code, and tags <Hn> and </H> representing a heading are defined in addition to the tags for the hyperlink.

When a document including such tags is translated, an erroneous translated sentence may, in some cases, be formed unless preprocessing recognizing the tags is performed. In order to solve such a problem, it is considered that tag information is deleted in the stages of the preprocessing. In this method, however, attributes such as style information are dropped, so that the style of the original text cannot be reflected in the translated sentence. Even if the positions where the tags appear in the original text are stored in order to form a translated sentence maintaining the style of the original text, the relationship between the positions where a word appears in the original text and a translated sentence varies in such translation between languages that the word order greatly differs, for example, English and Japanese, which is not effective.

A method in which tag information such as information relating to a style is given as an attribute of a word in the stages of the preprocessing is considered. In the attribute processing of tags, the tags must be classified into some types depending on a range modified by the tags.

For example, in the following illustrative sentence (1), a range modified by tags <H3> and </H3> representing a heading is the entire sentence. A range modified by tags <A HREF="hypertext4/what2.html"> and </A> representing a hyperlink is only one word "here":

<H3>Japanese Page is<A HREF="hypertext4/what2.html">here</A></H3>   illustrative sentence (1)

Furthermore, in the following illustrative sentence (2), a range modified by tags <FONT SIZE=+3> and </FONT> representing a font size is only one character "N":

<FONT SIZE=+3>N</FONT>ETWORK   illustrative sentence (2)

Specifically, as a range modified by tags, there are three types, that is, (a) the entire sentence, (b) a word (also including two or more words, provided that tags modifying two or more words do not modify the entire sentence), and (c) a character. In the translation processing shown in FIG. 9, sentence attribute processing, word attribute processing, and character attribute processing are respectively performed with respect to the tags modifying the entire sentence, the tags modifying the word or words, and the tags modifying the character.

There are a case where the tags <A . . . > and </A> representing the hyperlink information modify one or two or more words, as shown in an illustrative sentence (3), and a case where they modify the entire sentence, as shown in an illustrative sentence (4).

<B><FONT SIZE=+3>J</FONT>Japanese Page is<A HREF="/misc/index.html">Here</A>.</B>   illustrative sentence (3)

<A HREF="/misc/index.html">Japanese Page is Here</A>.   illustrative sentence (4)

In the illustrative sentence (3), the tags <B> and </B> are tags for displaying an English sentence (the entire sentence) put therebetween by boldface. The tags <FONT SIZE=+3> and </FONT> are tags for designating the font size of a character put therebetween. The tags <A HREF="misc/index.html"> and </A> are tags representing hyperlink information and indicating that the word "Here" put between the tags is an anchor of a hyperlink (a keyword).

Description is made of the procedure in a case where translation from English into Japanese is made by the translation processing unit 22. It is herein assumed that the original text to be translated is an English sentence shown in the foregoing illustrative sentence (3):

<B><FONT SIZE=+3>J</FONT>Japanese Page is<A HREF="/misc/index.html">Here</A>.</B>   original text (3)

When the original text to be translated is entered (step 11), it is judged whether or not the mode in which a keyboard which is an anchor of a hyperlink is translated is set (step 12). This judgment is made depending on which of the keyword translation mode and the keyword non-translation mode is set by a user.

Description is now made of a case where it is judged that the keyword translation mode is set in the step 12. When the keyword translation mode is set (YES in the step 12), character attribute processing is first performed (step 21). Specifically, tags modifying a character are retrieved. If the tags modifying the character are retrieved, the positions of the tags are so changed that the tags modify the entire sentence.

In the foregoing original text (3), the tags <FONT SIZE=+3> and </FONT> are tags modifying a character, whereby the original text is converted into the following English sentence (5) by the character attribute processing.

<B><FONT SIZE=+3>Japanese Page is<A HREF="/misc/index.html">Here</A>.</B></FONT>   English sentence (5)

In the character attribute processing, the positions of the tags modifying a character may be so changed that the tags modify a word including the character.

When the character attribute processing is terminated, sentence attribute processing is performed with respect to a sentence which has been subjected to the character attribute processing (step 22). Specifically, tags modifying the entire sentence are retrieved. When a tag exists at the head of the sentence and a tag paired with the tag does not exist in the middle of the sentence, it is judged that the tag is a tag at the head of the sentence modifying the entire sentence. When a tag exists at the end of the sentence, it is judged that the tag is a tag at the end of the sentence modifying the entire sentence.

In the foregoing English sentence (5), it is judged that the start tags <B> and <FONT SIZE=+3> are tags at the head of the sentence modifying the entire sentence. On the other hand, the end tags </B> and </FONT> are tags at the end of the sentence modifying the entire sentence. The following English sentence (6) excluding the tags modifying the entire sentence in the English sentence (5) is an object of form elementary analysis:

Japanese Page is<A HREF="/misc/index.html">Here</A>   English sentence (6)

The tags at the head of the sentence modifying the entire sentence and the tags at the end of the sentence modifying the entire sentence are stored in relation to the object of form elementary analysis.

Form elementary analysis processing is performed with respect to the English sentence (6) which is judged to be an object of form elementary analysis (step 23). In the form elementary analysis in the step 23, the keyword translation mode is set, whereby a start tag <A . . . > and an end tag </A> in the hyperlink information are also respectively treated as one words.

The results of the form elementary analysis with respect to the English sentence (6) are as shown in the following Table 1:

TABLE 1

| heading | part of speech | conjugation |
| --- | --- | --- |
| Japanese | adjective | |
| Page | noun | |
| is | verb | the third person |
| <A HREF="/misc/index.html"> | | |
| Here | adverb | |
| </A> | | |

After the form elementary analysis processing, word attribute processing is performed (step 24). In the word attribute processing, a start tag out of a pair of tags modifying a word is attributed to a word just behind the start tag as front tag information. That is, a start tag is stored in relation to a word just behind the start tag as front tag information. On the other hand, an end tag is attributed to a word just ahead of the end tag as rear tag information. That is, an end tag is stored in relation to a word just ahead of the end tag as rear tag information.

The English sentence (6) is taken as an example. As shown in Table 2, the start tag <A HREF="/misc/index.html"> is attributed to the word "Here" just behind the start tag as front tag information. On the other hand, the end tag </A> is attributed to the word "Here" just ahead of the end tag as rear tag information.

TABLE 2

| heading | part of speech | conjugation | front tag | rear tag |
|---|---|---|---|---|
| Japanese Page is | adjective noun verb | the third person | | |
| Here | adverb | | <A HREF=/misc/index.html"> | </A> |

When the word attribute processing is terminated, syntactic and semantic analysis is carried out (step 25). Conversion processing is performed on the basis of the results of the syntactic and semantic analysis (step 26). That is, Japanese equivalents are respectively assigned to words in Table 2. Thereafter, syntax formation processing is performed on the basis of the results of the syntactic and semantic analysis (step 27). Specifically, the Japanese equivalents obtained in the step 26 are so assembled as to constitute a Japanese sentence in accordance with a Japanese grammar. In the above-mentioned example, a Japanese sentence "こちらです" is obtained.

Thereafter, tag attribute restoration processing is performed (step 28). Specifically, tags modifying a word are restored on the basis of the results of the word attribute processing in the step 24. In the foregoing illustrative sentence, the tags modifying the word are restored, whereby a translated sentence "<A HREF="/misc/index.html"<こちら</A>です" is obtained.

Tags modifying the entire sentence are restored on the basis of the results of the sentence attribute processing in the step 22. In this example, tags modifying a character are also changed into tags modifying the entire sentence by the character attribute processing, whereby the tags modifying the character are defined as the tags modifying the entire sentence in the translated sentence. In the above-mentioned example, the tags modifying the entire sentence are restored, whereby a translated sentence "<B><FONT SIZE=+3><A HREF="/misc/index.html"> こちら</A>です</B></FONT>" is obtained.

The translated sentence thus obtained is sent to the browser (step 29). In the browser, a sentence other than the tags in the sent translated sentence is displayed on the monitor. Consequently, a Japanese sentence "こちらです" is displayed. In this case, the typeface is a typeface designated by the tag <B>, the font size is displayed by a size designated by the tag <FONT SIZE=+3>, and "こちら" is so displayed that it can be found to be an anchor of a hyperlink.

Description is now made of a case where the keyword translation mode is not set in the step 12. When the keyword translation mode is not set, approximately the same processing steps 31 to 39 as the processing steps 21 to 29 in a case where the keyword translation mode is set are also performed.

In the following two cases, processing in a case where the keyword translation mode is not set, and processing in a case where the keyword translation mode is set, differ.

(i) A case where a sentence to be subjected to form elementary analysis includes tags representing hyperlink information (ii) A case where tags representing hyperlink information modify the entire sentence.

In the foregoing case (i), form elementary analysis processing performed when the keyword translation mode is not set (step 33) differs from the elementary analysis processing performed when the keyword translation mode is set (step 23).

In the form elementary analysis in the step 33, the keyword translation mode is not set, whereby the entire hyperlink information is treated as one word. When a sentence to be subjected to form elementary analysis is the foregoing English sentence (6), therefore, the results of the form elementary analysis corresponding thereto are as shown in the following Table 3.

Japanese Page is<A HREF="/misc/index.html">Here</A>  (6)

TABLE 3

| heading | part of speech | conjugation |
|---|---|---|
| Japanese Page is | adjective noun verb | the third person |
| <A HREF="/misc/index.html">Here</A> | noun | |

In word attribute processing performed after the form elementary analysis processing (step 34), tags for a hyperlink are not attributed.

As a result, when the original text is the above-mentioned illustrative sentence (3), a translated sentence outputted in the step 39 is "<B><FONT SIZE=+3><A HREF="/misc/index.html">Here</A>です</B></FONT>".

In the foregoing case (ii), sentence attribute processing performed when the keyword translation mode is not set (step 32) differs from the sentence attribute processing performed when the keyword translation mode is set (step 22).

For example, consider a case where the original text is the foregoing illustrative sentence (4).

<A HREF="/misc/index.html">Japanese Page is Here</A>.    illustrative sentence (4)

In such a case, when the keyword translation mode is set, it is judged that the tag <A HREF="/misc/index.html"> is a tag at the head of the sentence modifying the entire sentence, and the tag </A> is a tag at the end of the sentence modifying the entire sentence by the sentence attribute processing in the foregoing step 22. A portion "Japanese Page is Here" excluding the tags modifying the entire sentence in the illustrative sentence (4) is an object of form elementary analysis. The tag at the head of the sentence modifying the entire sentence and the tag at the end of the sentence modifying the entire sentence are stored in relation to the object of form elementary analysis.

On the other hand, in sentence attribute processing in a case where the keyword translation mode is not set, when it is judged that the tags modifying the entire sentence are tags for a hyperlink, the sentence attribute processing is not performed with respect to the tags. Specifically, the entire illustrative sentence (4) is an object of form elementary analysis.

Although description was now made of a document conversion system for converting an English document into a Japanese document, the present invention is also applicable to a document conversion system for converting a Japanese document into an English document.

Figure 10:
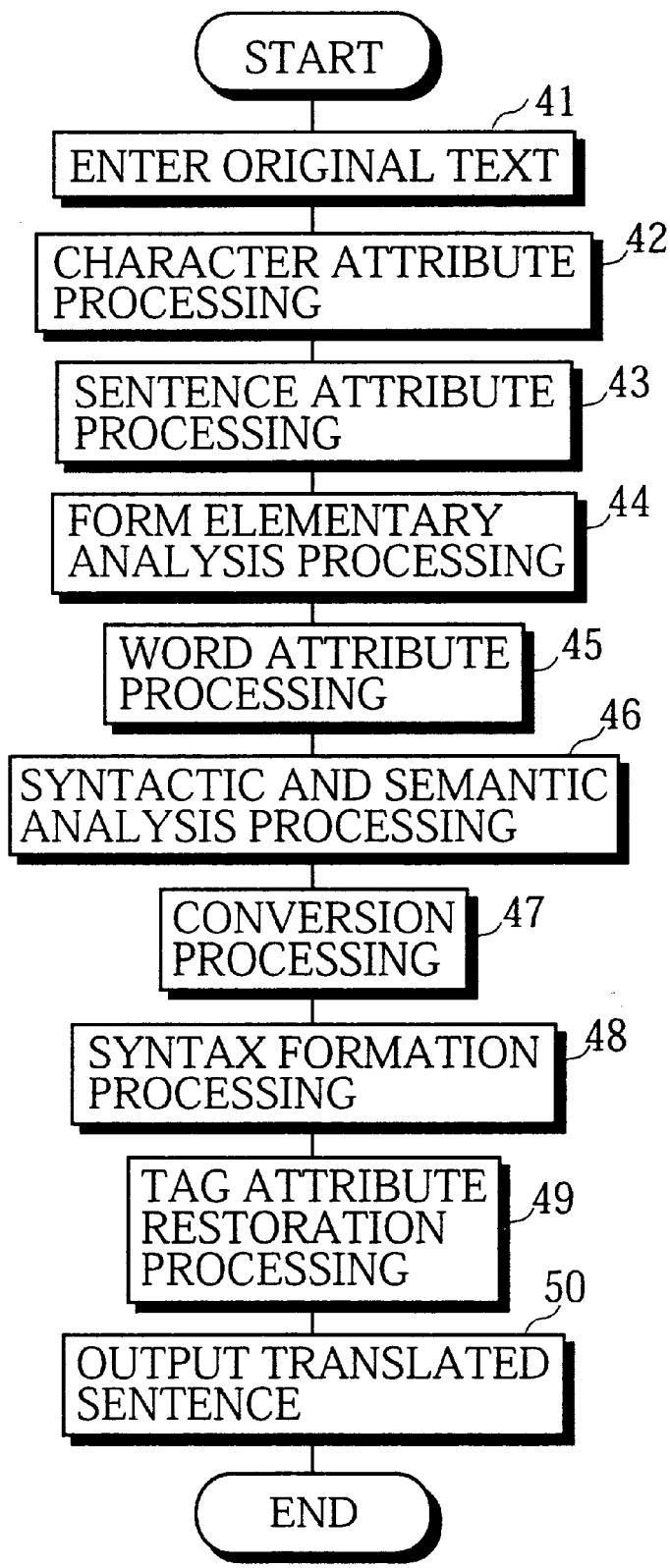
FIG. 10 is a flow chart showing the procedure for translation processing in a case where an HTML document in Japanese is converted into an HTML document in English.
Figure 4:
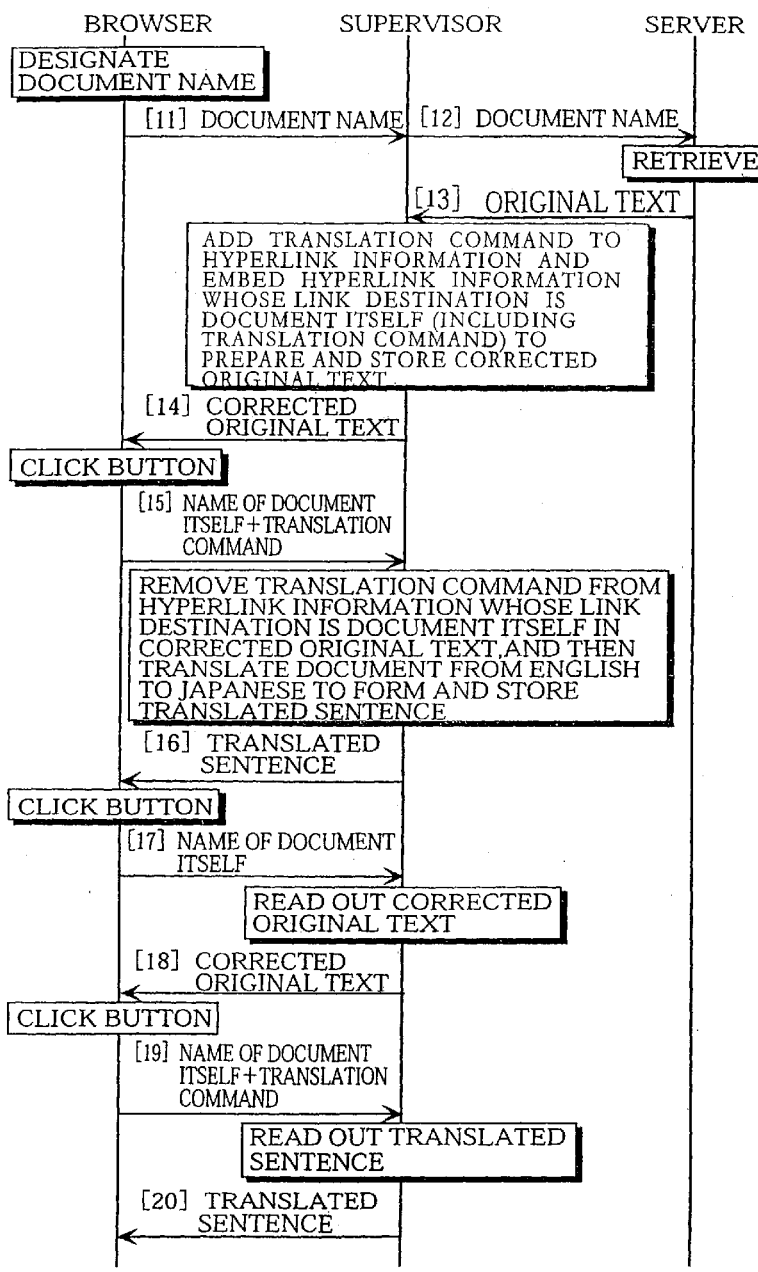
Figure 7:
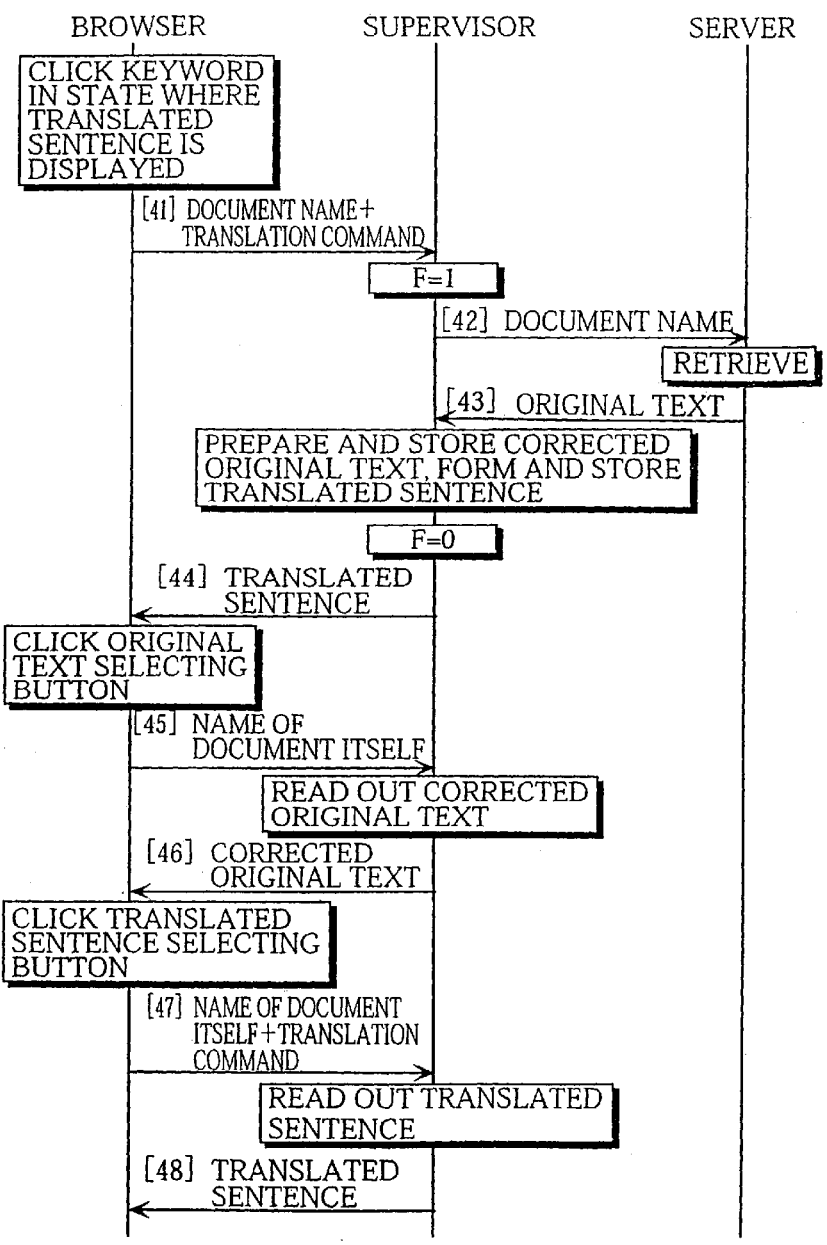

In the document conversion system for converting a Japanese document into an English document, translation from Japanese into English is made by the translation processing unit 22. FIG. 10 shows the procedure for translation processing in a case where translation from Japanese into English is made by the translation processing unit 22. Description is now made of a case where an anchor of a hyperlink is also translated.

Description is now made of the procedure for translation processing by taking the following original text (7) as an example:

<B><FONT SIZE=+3>英<FONT>語のページは<A HREF="english.html">こちらです</A>.</B>　original text (7)

In the original text (7), the tags <B> and </B> are tags for displaying a sentence put therebetween by boldface. In the original text (7), the tags <FONT SIZE=+3> and </FONT> are tags for designating the font size of a character put therebetween. In the original text (7), the tags <A HREF="english.html"> and </A> are tags representing hyperlink information and indicating that a word "こちらです" put between the tags is an anchor of a hyperlink (a keyword).

When an original text to be translated is entered (step 41), character attribute processing is performed (step 42). That is, tags modifying a character are retrieved. When the tags modifying the character are retrieved, the positions of the tags are so changed that the tags modify the entire sentence.

In the foregoing original text (8), the tags <FONT SIZE=+3> and </FONT> are tags modifying a character, whereby the original text is converted into the following Japanese sentence (8) by the character attribute processing:

<B><FONT SIZE=+3>英語のページは<A HREF="english.html">こちらです</A>.</B></FONT>　Japanese sentence (8)

In the character attribute processing, the positions of the tags modifying a character may be so changed as to modify a word including the character.

When the character attribute processing is terminated, a sentence which has been subjected to the character attribute processing is subjected to sentence attribute processing (step 43). Specifically, tags modifying the entire sentence are retrieved. When a tag exists at the head of the sentence and a tag paired with the tag does not exist in the middle of the sentence, it is judged that the tag is a tag at the head of the sentence modifying the entire sentence. When a tag exists at the end of the sentence, it is judged that the tag is a tag at the end of the sentence modifying the entire sentence.

In the foregoing Japanese sentence (8), it is judged that the start tags <B> and <FONT SIZE=+3> are tags at the head of the sentence modifying the entire sentence. On the other hand, it is judged that the end tags </B> and </FONT> are tags at the end of the sentence modifying the entire sentence. The following Japanese sentence (6) excluding the tags modifying the entire sentence in the Japanese sentence (8) is an object of form elementary analysis:

英語のページは<A HREF="english.html">こちらです</A>.　Japanese sentence (9)

The tag at the head of the sentence modifying the entire sentence and the tag at the end of the sentence modifying the entire sentence are stored in relation to the object of form elementary analysis.

Form elementary analysis processing is performed with respect to the Japanese sentence (9) which is judged to be an object of form elementary analysis (step 44). In this case, it is assumed that a keyword is also translated.

The results of the form elementary analysis with respect to the Japanese sentence (9) are as shown in the following Table 4:

TABLE 4

| heading | part of speech | conjugation |
|---|---|---|
| 英語 | noun | |
| の | auxiliary word | |
| ページ | noun | |
| は | auxiliary word | |
| <A HREF="english.html"> | | |
| こちら | pronoun | |
| です | auxiliary verb | end-form |
| </A> | | |
| 。 | punctuation mark | |

In Table 4 shown above, the auxiliary word means a postpositional word functioning as an auxiliary to a main word.

After the form elementary analysis processing, word attribute processing is performed (step 45). In the word attribute processing, a start tag out of a pair of tags modifying a word is attributed to a word just behind the start tag as front tag information. That is, a start tag is stored in relation to a word just behind the start tag as front tag information. On the other hand, an end tag is attributed to a word just ahead of the end tag as rear tag information. That is, an end tag is stored in relation to a word just ahead of the end tag as rear tag information.

The Japanese sentence (9) is taken as an example. As shown in Table 5, the start tag <A HREF="english.html"> is attributed to the word "こちら" just behind the start tag as front tag information. On the other hand, the end tag </A> is attributed to the word "です" just ahead of the end tag as rear tag information.

TABLE 5

| heading | part of speech | conjugation | front tag | rear tag |
|---|---|---|---|---|
| 英語 | noun | | | |
| の | auxiliary word | | | |
| ページ | noun | | | |
| は | auxiliary word | | | |
| こちら | pronoun | | <A HREF="english.html"> | |
| です | auxiliary verb | end-form | | </A> |
| 。 | punctuation mark | | | |

In Table 5 shown above, the auxiliary word means a postpositional word functioning as an auxiliary to a main word.

When the word attribute processing is terminated, syntactic and semantic analysis is carried out (step 46). Conversion processing is performed on the basis of the results of the syntactic and semantic analysis (step 47). That is, English equivalents are respectively assigned to words in Table 5. Thereafter, syntax formation processing is performed on the basis of the results of the syntactic and semantic analysis (step 48). Specifically, the English equivalents obtained in the step 47 are so assembled as to constitute an English sentence in accordance with an English grammar. In the above-mentioned example, an English sentence "English page is here" is obtained.

Thereafter, tag attribute restoration processing is performed (step 49). Specifically, tags modifying a word are restored on the basis of the results of the word attribute processing in the step 45. In the foregoing illustrative sentence, the tags modifying the word are restored, whereby a translated sentence "English page is<A HREF="english.html">here</A>." is obtained.

Tags modifying the entire sentence are restored on the basis of the results of the sentence attribute processing in the step 43. In this example, tags modifying a character are also changed into tags modifying the entire sentence by the character attribute processing, whereby the tags modifying the character are defined as tags modifying the entire sentence in the translated sentence. In the above-mentioned example, the tags modifying the entire sentence are restored, whereby a translated sentence "<B><FONT SIZE=+3>English page is<A HREF="english.html"> here</A>.</B></FONT>" is obtained.

The translated sentence thus obtained is sent to the browser (step 29). In the browser, a sentence other than the tags in the sent translated sentence is displayed on the monitor. Consequently, an English sentence "English page is here." is displayed. In this case, the typeface is a typeface designated by the tag <B>, the font size is displayed by a size designated by the tag <FONT SIZE=+3>, and "here" is so displayed that it can be found to be an anchor of a hyperlink.

The translating processing shown in FIG. 9 is also applicable to a case where an HTML document prepared in English is automatically translated into an HTML document in Japanese. Further, the translation processing shown in FIG. 10 is also applicable to a case where an HTML document prepared in Japanese is automatically translated into an HTML document in English.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An HTML document translating machine for converting an HTML document whose text is described in a first language into an HTML document whose text is described in a second language, comprising:

first means for retrieving a first tag modifying the entire sentence from the original text, taking, when the first tag modifying the entire sentence exists, a sentence obtained by removing the first tag modifying the entire sentence from the original text as a sentence to be subjected to form elementary analysis, and storing said tag modifying the entire sentence in relation to said sentence to be subjected to form elementary analysis;

second means for subjecting said sentence to be subjected to form elementary analysis obtained by the first means to form elementary analysis including word division and grammar analysis;

third means for retrieving a second tag modifying one or a plurality of words from said sentence to be subjected to form elementary analysis on the basis of the results of the form elementary analysis by the second means, and storing, when the second tag modifying one or a plurality of words exists, a start tag which together with an end tag, constitutes the second tag in relation to a first word just behind the start tag and storing the end tag in relation to a second word just ahead of the end tag;

fourth means for subjecting a sentence obtained by removing said second tag from said sentence to be subjected to form elementary analysis to syntactic and semantic analysis;

fifth means for respectively assigning equivalents in a second language to words constituting the sentence obtained by removing said second tag from said sentence to be subjected to form elementary analysis on the basis of the results of the analysis by the fourth means and so assembling the equivalents as to constitute a sentence in the second language, to form a translated sentence in the second language;

sixth means for adding the start tag stored in relation to said first word ahead of the equivalent corresponding to said first word and adding the end tag stored in relation to said second word behind the equivalent corresponding to said second word in the translated sentence formed by the fifth means; and seventh means for adding the first tag modifying the entire sentence stored by the first means to a sentence obtained by the sixth means.

2. An HTML document translating machine for converting an HTML document whose text is described in a first language into an HTML document whose text is described in a second language, comprising:

first means for retrieving a first tag modifying only one character from the original text, and changing, when the first tag modifying only one character exists, the position of the first tag so that the first tag modifies either one of the entire sentence and a word including the character modified by the first tag;

second means for retrieving a second tag modifying the entire sentence from the original text which has been subjected to the processing by the first means, and taking, when the second tag modifying the entire sentence exists, a sentence obtained by removing the second tag modifying the entire sentence from the original text as a sentence to be subjected to form elementary analysis, and storing said second tag modifying the entire sentence in relation to said sentence to be subjected to form elementary analysis;

third means for subjecting said sentence to be subjected to form elementary analysis obtained by the second means to form elementary analysis including word division and grammar analysis;

fourth means for retrieving a third tag modifying one or a plurality of words from said sentence to be subjected to form elementary analysis on the basis of the results of the form elementary analysis by the third means, and storing, when the third tag modifying one or a plurality of words exists, a start tag which together with an end tag, constitutes the third tag in relation to a first word just behind the start tag and storing the end tag in relation to a second word just ahead of the end tag;

fifth means for subjecting a sentence obtained by removing said third tag from said sentence to be subjected to form elementary analysis to syntactic and semantic analysis;

sixth means for respectively assigning equivalents in a second language to words constituting the sentence obtained by removing said third tag from said sentence to be subjected to form elementary analysis on the basis of the results of the analysis by the fifth means and so assembling the equivalents as to constitute a sentence in the second language, to form a translated sentence in the second language;

seventh means for adding the start tag stored in relation to said first word ahead of the equivalent corresponding to said first word and adding the end tag stored in relation to said second word behind the equivalent corresponding to said second word in the translated sentence formed by the sixth means; and eighth means for adding the second tag modifying the entire sentence stored by the second means to a sentence obtained by the seventh means.

* * * * *

UNITED STATES PATENT AND TRADEMARK OFFICE
CERTIFICATE OF CORRECTION

PATENT NO.   : 6,647,364 B1
DATED        : November 11, 2003
INVENTOR(S)  : Takesi Yumura et al.

It is certified that error appears in the above-identified patent and that said Letters Patent is hereby corrected as shown below:

Drawings,
Figure 4, replace drawing with drawing of Figure 4 attached hereto.
Figure 7, replace drawing with drawing of Figure 7 attached hereto.

Signed and Sealed this

Twenty-first Day of September, 2004

JON W. DUDAS
*Director of the United States Patent and Trademark Office*